Aug. 28, 1951  J. P. LISSIMORE  2,565,975
LABELING APPARATUS
Filed March 28, 1950  9 Sheets-Sheet 1

INVENTOR
John Phillip Lissimore
BY
Richardson David and Nydon
his AGENTS.

Aug. 28, 1951

J. P. LISSIMORE 2,565,975

LABELING APPARATUS

Filed March 28, 1950

INVENTOR:
John Philip Lissimore
BY Richardson, David and Norton
Atty's

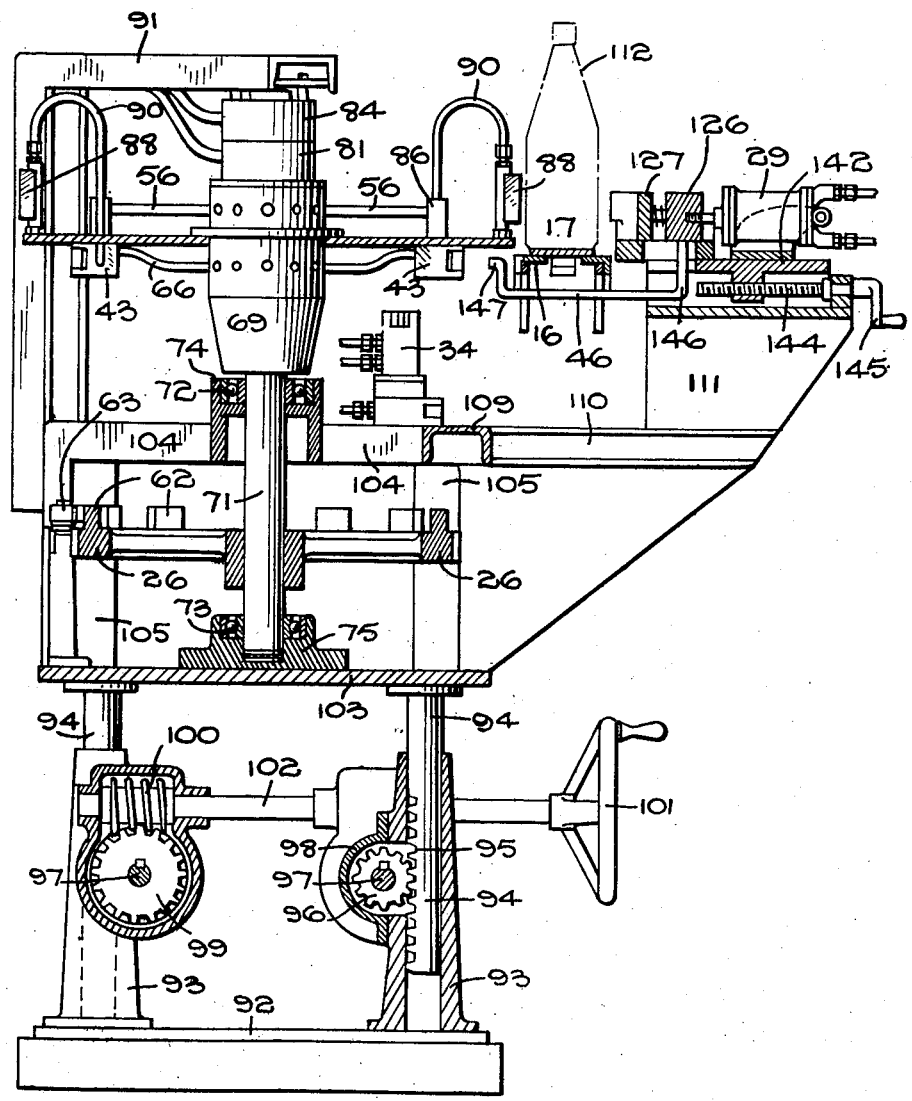

Aug. 28, 1951  J. P. LISSIMORE  2,565,975
LABELING APPARATUS
Filed March 28, 1950  9 Sheets-Sheet 4
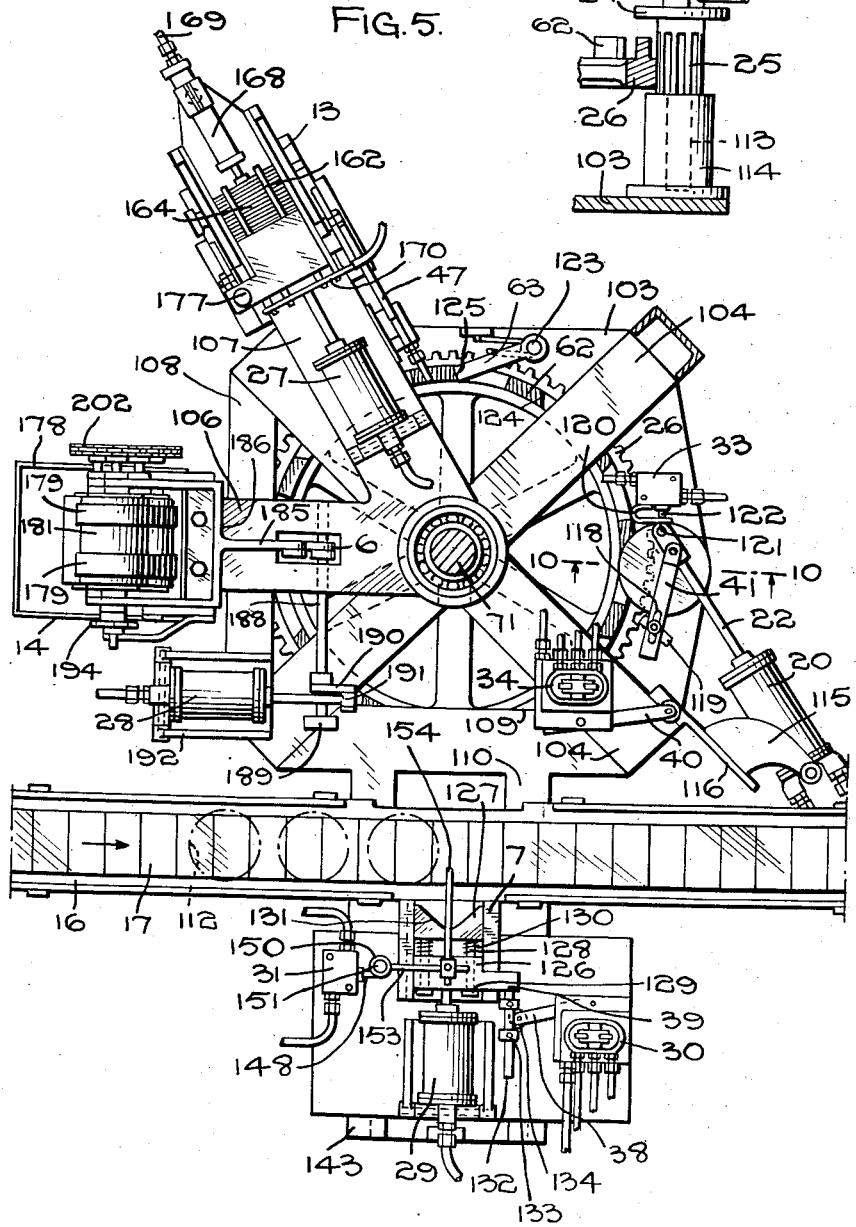
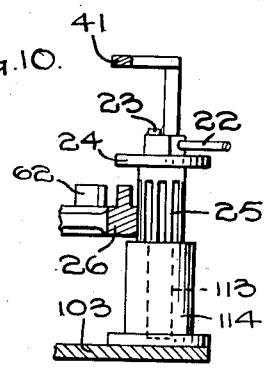
INVENTOR:
John Philip Lissimore.
BY Richardson, David and Nudon
ATTYS

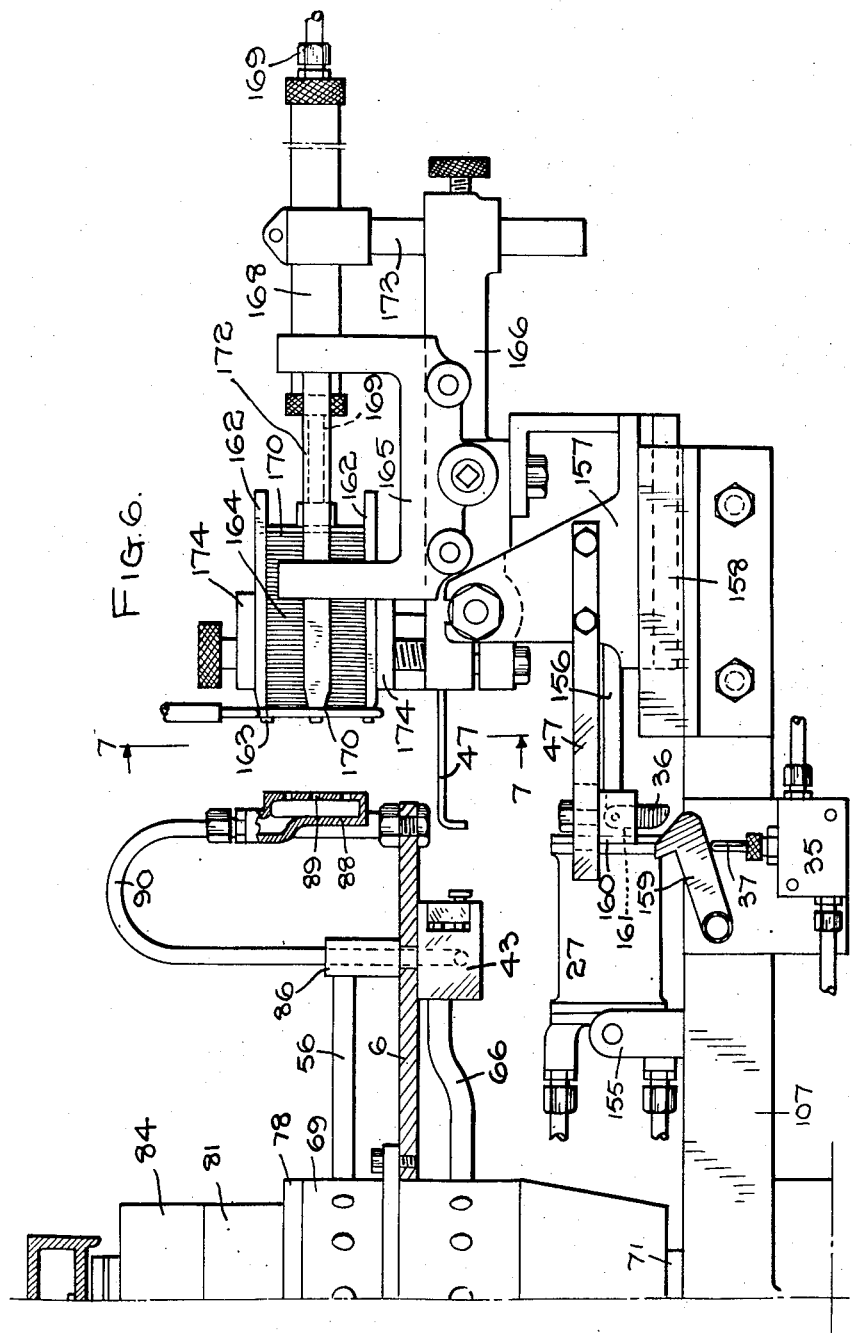

Aug. 28, 1951     J. P. LISSIMORE     2,565,975
LABELING APPARATUS
Filed March 28, 1950                              9 Sheets-Sheet 6
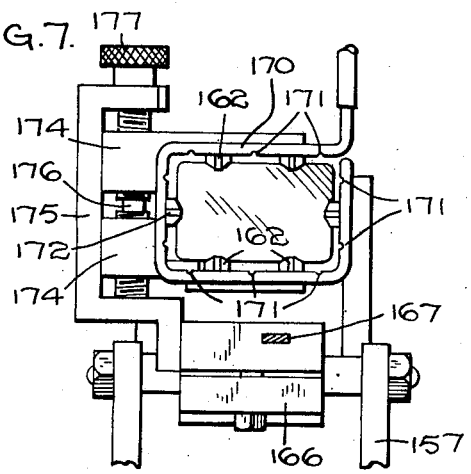
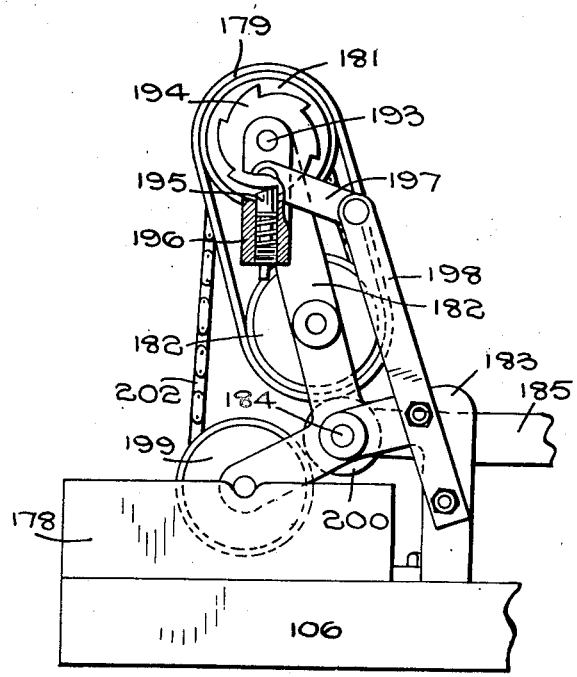
INVENTOR
John Phillip Lissimore
BY Richardson, David and Jordan
AGENTS.

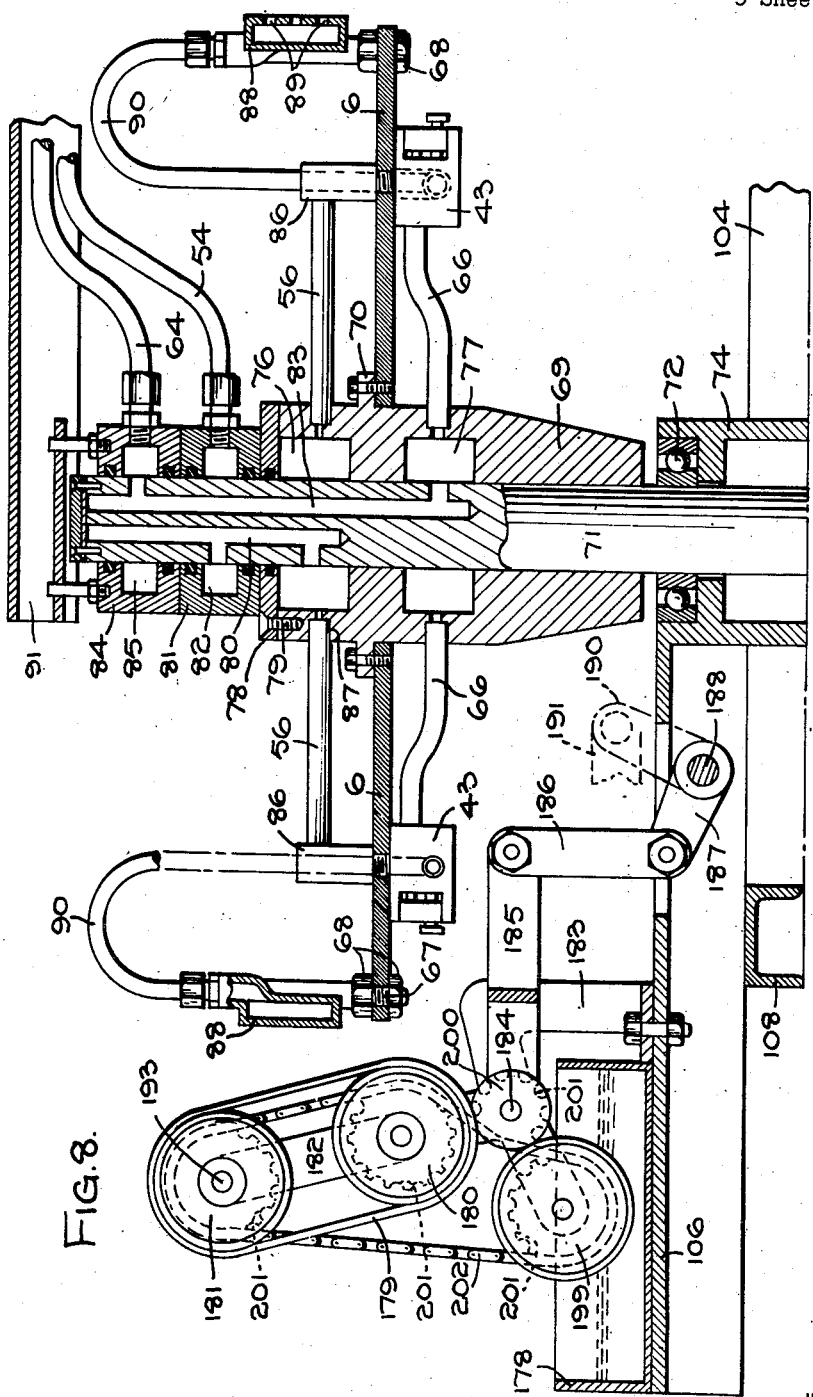

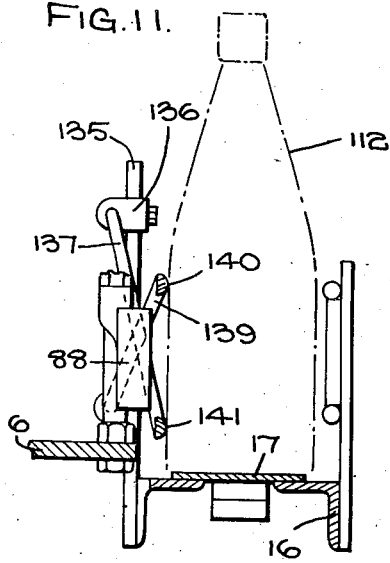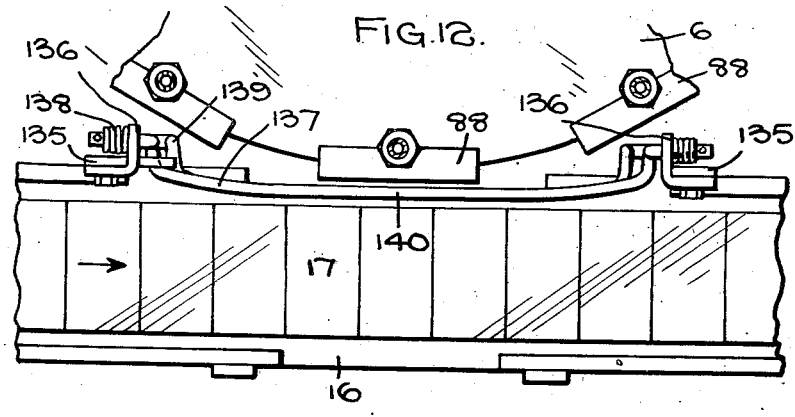

INVENTOR
John Phillip
Lissimore
BY Richardson, David and Norton
his AGENTS.

Patented Aug. 28, 1951

2,565,975

UNITED STATES PATENT OFFICE 2,565,975

LABELING APPARATUS

John Philip Lissimore, Dudley, England

Application March 28, 1950, Serial No. 152,426
In Great Britain April 6, 1949

26 Claims. (Cl. 216—55)

The present invention relates to apparatus for labelling articles and one of the main objects of the invention is to provide a new or improved construction of machine capable of labelling at an increased speed as compared with machines hitherto proposed of the kind in which there is provided an intermittently rotatable head, a plurality of outwardly facing transfer members mounted thereon, said transfer members being adapted to be supplied at different portions of the path along which they travel with pneumatic suction or pressure to retain labels on said members while co-operating with a label pack in a magazine and an adhesive applying device disposed beyond the periphery of the head and to project the resultant adhesive coated labels retained on the transfer members onto the articles positioned successively at a labelling station also disposed beyond but closely adjacent to the periphery of the head.

In machines of this type it has been found that the time taken to label any individual article in a series presented successively at the labelling station is made up of the separate time taken to convert the suction in the transfer member waiting at the labelling station and carrying an adhesively coated label, to pressure, to cause this label to be projected onto the article, and the time required to rotate the head through a distance equal to the angular separation between the transfer members mounted thereon so that the next transfer member is presented in readiness at the labelling station for the next article.

The second of these two times is found in practice to be considerably greater than the first, and consequently, it is primarily to a reduction of the second mentioned time that improvements must be directed in machines of this class to obtain an increase in the speed of labelling.

More specifically therefore the main object of the present invention is to reduce this second mentioned time.

A further object of the invention is to reduce the time required for labelling each article by employing a new or improved arrangement in which the transfer members are mounted fixedly on the head and co-operate with a label magazine and adhesive applying device which are movable towards and away from the head, and with an article positioned at the labelling station which is moved towards the head by an article arresting member against resilient stop means positioned adjacent to the periphery of the head.

Not only is the moment of inertia of the head thus inherently reduced since there is no longer any need to provide mechanism thereon for moving the transfer members outwardly, and consequently the transit time of the transfer members between the stopped positions is reduced, but also, the action of the article arresting member in moving an article at the labelling station towards the resilient stop and hence to a position closely adjacent the transfer member at the labelling station may be employed to effect concurrent changeover of this transfer member from suction to pressure and thus reduce that portion of the time which is required for the actual labelling of the article.

In prior proposed arrangements, in which the movement of an article by an arresting member at the labelling station served to initiate the sequence of operations of the machine, of which the first step was the outward movement of the transfer members, the time interval occupied by this outward movement represented a wastage of time before the changeover from suction to pressure occurred.

A further object of the present invention as applicable, not only to labelling machines of the type referred to above, but also to any labelling machine employing an intermittently rotatable head, is to provide a new or improved drive mechanism for imparting intermittent rotary motion to the head and new or improved means for arresting the head in each of the stopped positions.

A further object of the invention which has reference exclusively to that type of machine employing transfer members supplied with pneumatic suction and pressure alternately for extracting labels from a magazine and applying them to articles at a labelling station after coating with adhesive, is to provide a new or improved form of label magazine with a view primarily to reducing or overcoming the tendency of the transfer member to extract more than one label at a time.

Still another object of the present invention is to provide a new or improved form of adhesive applying device, primarily with a view to overcoming or reducing the tendency for a label held by suction on a transfer member, and brought into contact with a member of the adhesive applying device coated with liquid adhesive, being stripped from the transfer member and retained on the adhesively coated member.

A further object of the present invention is to provide improvements in the structural support for the rotary head enabling the transfer members to be adjusted in height relatively to a conveyor passing through the labelling station, so that adjustment of the height at which the label is applied to an article may readily be varied without stopping the apparatus or effecting the installation of modified transfer members.

A further object of the invention is to provide a new or improved system of operating the moving parts of the machine and control means interconnecting the individual actuating devices for these moving parts in such a manner that they operate in the correct sequence and with a high degree of reliability.

Further objects and advantages of my invention will be pointed out or will be apparent from the following description of a preferred embodiment thereof illustrated in the accompanying drawings in which:

Figure 4 is a view in end elevation of the apparatus in cross section on the lines 4—4 of Figure 1.

Figure 5 is a plan view of the apparatus with the head removed to expose the drive mechanism beneath.

Figure 6 is a fragmentary view on an enlarged scale and in side elevation showing the label magazine and pneumatically energised actuating device therefor.

Figure 7 is a view of the label magazine in cross section on the line 7—7 of Figure 6.

Figure 8 is a view in cross section on the line 8—8 of Figure 1, showing the construction of the head including the central hub thereof on an enlarged scale and also showing in side elevation, the adhesive applying device and actuating linkage.

Figure 9 is a view in side elevation of the adhesive applying device showing a part of the pawl and ratchet drive mechanism in cross section.

Figure 10 is a fragmentary view in cross section on the line 10—10 of Figure 5 showing part of the drive mechanism for the head.

Figure 11 is a fragmentary view on an enlarged scale showing the resilient stop provided adjacent to the periphery of the head at the labelling station.

Figure 12 is a plan view of the parts shown in Figure 11.

GENERAL ARRANGEMENT OF PARTS

Figure 1:
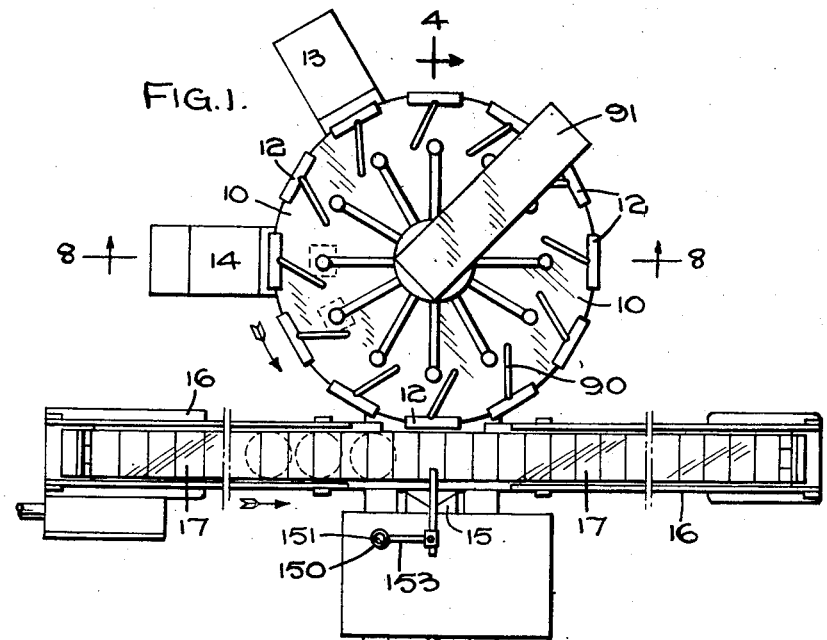
Figure 1 is a plan view of an apparatus for labelling articles, such as bottles, constructed in accordance with my invention.
Figure 2:
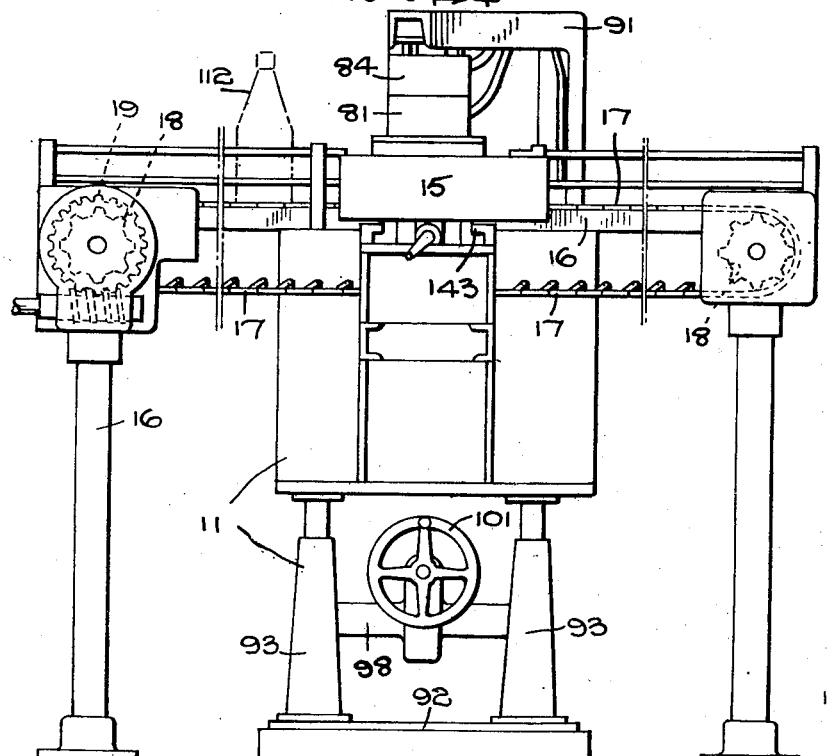
Figure 2 is a view of the same apparatus in front elevation.

Referring firstly to Figures 1 and 2 of the drawings the apparatus is provided with the intermittently rotatable head 10 supported for rotation about a vertical axis in bearings provided in a supporting structure 11.

Around the peripheral margin of the head are disposed a plurality of hollow transfer members 12 which at different positions of the path along which they travel as the head rotates are supplied within their interiors with pneumatic suction, or pressure, or are exhausted to atmospheric pressure so that whilst supplied with suction and by virtue of the openings provided in their outer faces, they may extract labels from a label magazine indicated generally at 13 retaining these labels whilst co-operating with an adhesive applying device indicated at 14 and while supplied with air under pressure project said adhesively coated labels onto an article positioned at the labelling station by an article arresting member 15.

While travelling from the labelling station towards the magazine the transfer members are exhausted to the atmosphere and their interiors are cut off from communication with the source of pneumatic suction and pressure so that there is no loss of either suction or pressure while the transfer members are traversing this portion of the path.

Articles for labelling are fed through the labelling station by a conveyor indicated generally at 16 which includes a horizontal travelling platform 17 in the form of an endless belt of pivotally connected slats and which is driven continuously by means of a sprocket 18 through a gear box 19.

Pneumatic circuit

Before proceeding to a description of the individual parts of the machine, reference will be made to Figure 3 of the drawings in which there is shown diagrammatically the pneumatically energised devices for operating the moving parts of the machine together with the main control valves therefor and the interconnecting pipe line system, to describe the sequence of operations of the machine and thus make apparent the operative relationship between the several moving parts, such as the head and its associated drive mechanism, the magazine, the adhesive applying device, and the article arresting member.

The driving device for the head comprises a pneumatic piston and cylinder unit constituting an elastically yieldable actuating device of the drive mechanism of which the cylinder or body is indicated at 20, and the piston at 21, the piston rod 22 of which is connected at its outer end to a crank pin 23 on a small diameter disc 24 fixed on a vertical spindle which also carries a pinion 25 forming the output element of the device and meshing with a large diameter gear 26 fixed to the rotatable head.

The piston and cylinder unit 27 serves to impart inward and outward radial movement with respect to the head to the label magazine 13, and a similar piston and cylinder unit 28, moves the adhesive applying device 14 towards and away from the head while still another piston and cylinder unit 29 serves to withdraw the article arresting member 15 clear of the labelling station (when in the position shown in Figure 3) or advance it across the labelling station towards the head and a transfer member positioned in register with the labelling station when it is required to label an article.

The piston and cylinder units 27, 28 and 29, associated respectively with the label magazine, the adhesive applying device and the article arresting member are all supplied with air under pressure through a main control valve 30.

The main control valve 30 is itself under the control of a subsidiary valve 31 actuated by an article trip member 32 and over-riding control on the valve 31 is exercised by a pilot valve 33 through which the valve 31 is connected to the main supply of air under pressure, the valve 33 being open only when the head is in one of the stopped positions, that is to say, one of the positions in which the magazine, the adhesive applying device and the labelling station, have a transfer member in register therewith.

The piston and cylinder unit 20 and 21 forming the drive means for the head, is supplied with air under pressure through a second main control valve 34 which itself under the control of a subsidiary valve 35 actuated by a member 36 moving to actuate the plunger 37 of the valve when the magazine moves outwardly.

The main control valve 30 is also controlled by a mechanical connection with the article arresting member, the connection being indicated diagrammatically by the lever arm 38 and the projection 39, while the main control valve 34 is additionally controlled mechanically from the piston rod 22 by a mechanical connection indicated diagrammatically by the lever arm 40 and a projection 41 from the piston rod.

The actual arrangement of these mechanical connections is somewhat different but effectively they produce the result which is achieved by the members indicated diagrammatically at 38 to 41.

Figure 3:
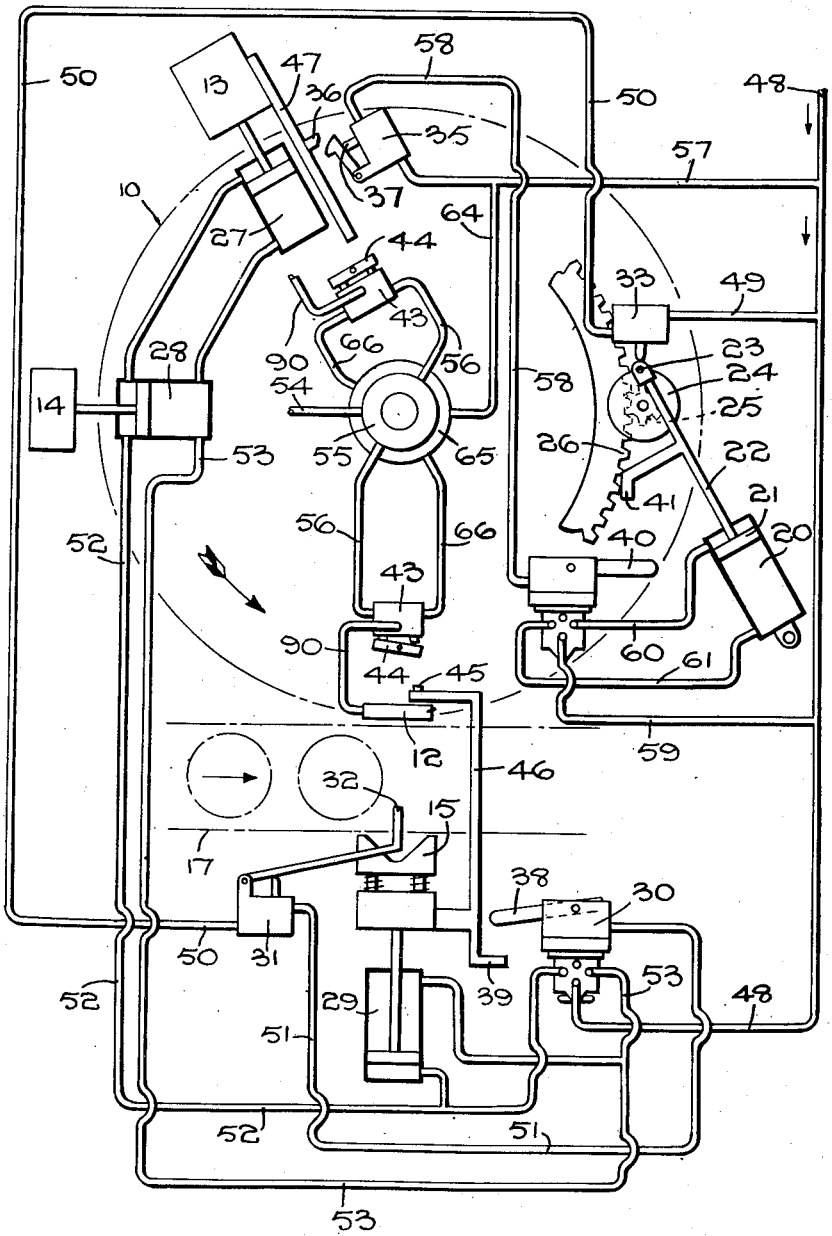
Figure 3 is a diagrammatic representation of the pneumatically energised actuating devices for the moving parts of the apparatus showing the controlling valves therefor and the interconnecting pipe line system.
Figure 13:
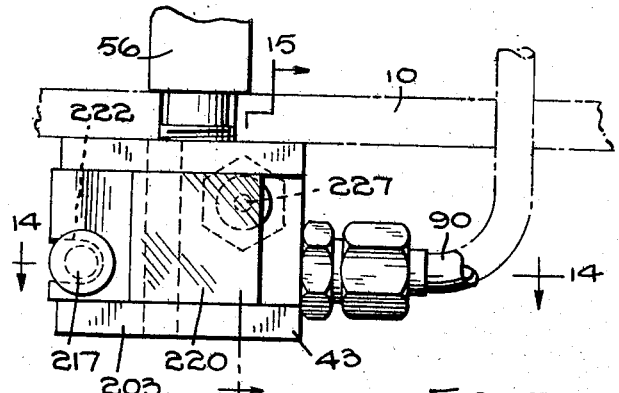
Figure 13 is a fragmentary view in side elevation and on an enlarged scale showing a control valve for one of the transfer members.
Figure 17:
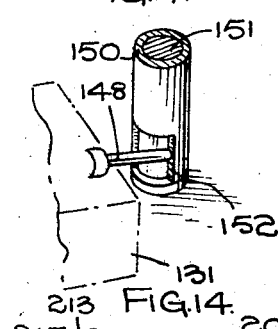
Figure 17 is a fragmentary view in front elevation showing the mechanism connecting the article trip member with the subsidiary valve actuated thereby.

The transfer members such as that indicated in Figure 3 at 12 are supplied with pneumatic suction or pressure or are exhausted to the atmosphere through control valve 43, each provided with a rocker 44 moved by engagement of the projection 45 on a change-over member in the form of a push rod 46 associated with the article arresting member or when in register with the label magazine by a change-over member such as the push rod 47.

The purpose of the various pipe line connections made between the piston and cylinder units, the main control valves and subsidiary control valves will best be understood if the cycle of operations of the apparatus is traced from the instant at which an article proceeding on the horizontally travelling platform 17 of the conveyor towards the labelling station engages the trip member 32.

It will first be assumed that as indicated in Figure 3 there will be at the labelling station awaiting the reception of an article a transfer member having on its outer face and retained thereon by suction a label of which the outer face has been previously coated with adhesive by co-operation with the device 14.

As the article approaches the labelling station it deflects the trip member 32 and opens the subsidiary valve 31 allowing air pressure from the main supply pipe line 48 to pass through the pipe line 49 through the over-riding valve 33 through the pipe lines 50 and 51 to the main control valve 30.

This is consequently placed in the position in which the pipe line 52 is connected to the incoming pressure supply 48 while pipe line 53 is connected to the exhaust port of the main control valve 30 so that as a result the article arresting member, the adhesive applying device and the magazine are all moved inwardly by their respective piston and cylinder units.

In doing so, the projection 45 on the push rod 46 associated with the article arresting member actuates the rocker 44 on the control valve 43 associated with a transfer member 12 at the labelling station and causes the suction previously applied to the interior of this transfer member to be replaced by a condition of pressure, transmitted through the main supply pipe line 48 and pipe lines 57 and 64 to the pressure header 65, and through pipe lines 66 to the control valve 43, so that the label is projected on to the face of the article, this article having been moved by the article arresting member across the labelling station until it is closely adjacent to the transfer member 12.

The transfer member in register with the label magazine previously in the condition in which its interior is exhausted to atmosphere, is, during the inward movement of the magazine connected through its control valve 43 actuated by the push rod 47 to the suction source entering the main suction pipe line 54 through the suction header chamber 55 and the radially extending pipe line 56 which enters the control valve 43. As a result, when the label pack is brought into contact with the face of the transfer member, the innermost label is extracted from the magazine and adheres to the transfer member.

The transfer member in register with the adhesive applying device will have already extracted a label from the magazine in a preceding operation and consequently the inward movement of the adhesive applying device merely applies a layer or coating of adhesive to the exposed face of this label.

Concurrently with the conversion of suction to pressure in respect of the transfer member 12 by the push rod 46, the projection 39 thereon changes over the position of the main control valve 30 by means of the lever arm 38 so that the pipe line 52 is now exhausted whilst the pipe line 53 is connected to the source of air under pressure.

Consequently, the article arresting member 15, the adhesive applying device, and the magazine are all withdrawn outwardly by their respective piston and cylinder units.

The article at the labelling station is thus released by the article arresting member 15 and owing to the provision of resilient stop means adjacent the transfer member at the labelling station (to be described in more detail later), the article is moved away clear of the transfer member and is subsequently carried away from the labelling station by the travelling platform 17 of the conveyor.

Concurrently, the outward movement of the label magazine causes the projection 36 on the push rod 47 to open the subsidiary control valve 35 with a result that air under pressure is applied from the supply pipe line 48 through pipe lines 57 and 58 to the second main control valve 34 to place this in such a position that the air pressure is transmitted from the inlet pressure pipe line 59 of the valve to the outlet pipe 60 while the other outlet pipe line 61 is connected to the exhaust port of the valve.

As a result, the piston 21 is moved towards the end of the cylinder remote from the piston rod and when it reaches this position the projection 41 bears against the lever arm 40 and converts the valve to a position in which the exhaust port of the valve is now connected to the pipe line 60 while the pipe line 61 is placed in communication with the pressure input pipe line 59.

The piston therefore passes over the inner dead centre position and moves outwardly to return to its original position, the pinion 25 driving the gear 26 and consequently the head through an angle equal to the angular displacement between adjacent transfer members. When the piston 21 reaches the outer dead centre position, that is, after one complete cycle of operations owing to the inertia of the moving parts, that is to say, the piston and piston rod itself, the disc 24, the pinion 25, the gear 26 and the head, there is a tendency for the piston to be carried beyond the outer dead centre position and to commence making a stroke towards the end of the piston remote from the piston rod.

Since, however, no change-over of the valve 34 is effected at the outer dead centre position, such change-over being capable of being effected only by the subsidiary control valve 35, the tendency of the drive mechanism to over-run beyond the outer dead centre position is eventually arrested by the continued air pressure in the cylinder 20 on the side of the piston remote from the piston rod, and the whole of the mechanism is reversed and tends to move back towards the outer dead centre position, movement of the head consequently being reversed.

As well as the teeth provided thereon, the gear 26 as shown clearly in Figures 4 and 5 is provided with a number of angularly spaced blocks, 62 on the upper face of its rim which co-operate with the pivoted arm 63 to form a pawl and ratchet mechanism, the end face of the arm engaging with one of the side faces of a block in the course of the return movement of the piston 21 towards the outer dead centre position, after the moving parts have over-run the outer dead centre position to a small extent as previously described.

The angular spacing of the blocks corresponds with the angular spacing of the transfer members and the stopped position is the one in which the magazine, the adhesive applying device and the labelling station, each have a transfer member located in registration therewith. As soon as the head has been brought to rest in the stopped position the over-riding valve 33 is opened by means of the end of the piston rod 22 so that the whole apparatus is ready to commence a second cycle of operations when a fresh article operates the trip member 32.

*Rotary head and transfer members*

Turning now to a description of the individual parts of the apparatus and referring especially to Figures 4 and 8 the intermittently rotatable head indicated generally at 10 in Figures 1 and 2 comprises a transfer member supporting portion in the form of a disc 6 preferably constructed of a light metal, such as aluminium, or one of its alloys.

The transfer members are supported by means of threaded shanks 67 passing through openings formed in the peripheral margin of the disc 66 and are secured in position by nuts 68.

The centre of the disc 6 has a circular opening through which extends a hub 69 having a radially extending flange 70 bolted to the disc, the hub itself being fixed to a vertical spindle 71 turning in ball bearings 72 and 73 supported respectively in housings 74 and 75 on the supporting structure for the head.

In the interior of the hub are formed two cavities 76 and 77 which, by virtue of the fact that the spindle 71 extends through the hub are of annular formation, the upper cavity 76 being closed by a plate 78 secured by screws 79 to the upper end of the hub.

The upper cavity is connected by a bore 80 to a stationary cylindrical header 81 extending around the spindle, the interior of which 82 is connected by a pipe line 54 to a source of pneumatic suction.

The lower cavity 77 is connected by a similar bore 83 extending axially through the spindle 71 to an upper header 84 of which the interior 85 is connected by a pipe line 64 to a source of pneumatic pressure.

The cavity 76 thus forming a suction reservoir common to all the transfer members is connected with each transfer member through pipe lines 56 extending radially outwards between the hub and the junction member 86 of each control valve 43.

In order to prevent undue loss of suction, should suction be applied through a control valve 43 to a transfer member when no label is retained thereon, communication between the pipe lines 56 and the cavity 76 is through small diameter orifices 87 in the wall of the hub so that the loss of suction is limited substantially to that contained in the pipe lines 56 and the interior of the junction member 86 and the valve 43, leakage from the common supply chamber 76 being at a very small rate owing to the presence of these small orifices.

The transfer members 12 themselves are each formed with a body in the form of a hollow boxlike member 88 having a plurality of small holes 89 extending through that wall of the box which is disposed outermost so as to form an outer face towards which air may be drawn through these holes to retain a label on this face, or from which air may be expelled to project a label on to an article positioned at the labelling station.

The transfer members are connected by pipe lines 90 to their associated control valves 43 and by virtue of the detachable mounting comprising a detachable shank and nuts 68 are capable of being removed from the disc 6 and replaced by transfer members of another formation suitable, for instance, for carrying a neck label for a bottle and applying it to the bottle. Alternatively, a composite neck and body label transfer member may be used.

The suction and pressure supply pipe lines 54 and 64 entering their respective headers are protected by a radially extending housing of inverted channel formation 91, the inner end of which is secured to the upper header and the outer end of which is supported from the main supporting structure for the head.

The main supporting structure for the head is of two-part formation, and comprises a base portion formed of base plate 92 and at each corner thereof upwardly extending hollow pillars 93 in which are slidably supported rods 94 secured to the upper portion of the supporting structure and formed with rack teeth 95 for engagement by pinions such as that seen at 96, Figure 4.

Four such pinions are provided, two on each of two shafts 97, supported in suitable bearings in the housings 98, each shaft having intermediate its ends a worm wheel 99 driven by a worm 100 rotatable by a hand wheel 101 fixed to the worm wheel shaft 102 in order to raise or lower simultaneously all four rods 94 with respect to the hollow pillars 93.

The upper portion of the supporting structure which carries the intermittently rotatable head comprises the rods 94 already mentioned, on the upper ends of which is carried a plate 103 in the centre of which is secured the bearing housing 75 for the lower ball bearing 73 of the spindle 71.

Above the plate 103 the upper portion of the supporting structure further comprises a spider having four legs 104, the outer ends of which extend downwardly as seen at 105 and are secured to the plate 103 in any suitable manner such as by welding.

The central part of the spider supports the upper bearing housing 74 to which there is also welded supporting members, arranged in V-formation as seen in plan, for the adhesive applying device and the label magazine, the legs of the V being indicated at 106 and 107.

For greater stiffness two of the legs 104 of the spider are connected by a cross member 108 and a further cross member 109 connects another pair of the legs 104, this cross member having an integrally formed forward extension 110 serving to support the article arresting member and its associated actuating piston and cylinder unit 29 and main control valve 30.

Between the bed 111 which extends upwardly from the outer end of the extension 110 forming the support means for the article arresting member, and the periphery of the head, a suitable space is left for the passage of the horizontal travelling platform 17 of the conveyor so that articles such as that shown at 112 can be advanced towards, into and away from the labelling station.

Drive mechanism for the rotary head

The drive mechanism for the rotary head already referred to in outline in connection with the overall operation of the apparatus comprises a gear 26 (Figure 4) which is fixed to the spindle 71 and which is provided on the upper face of its rim with angularly spaced blocks 62, the angular spacing of which is equal to that existing between the transfer members.

Meshing with the gears 36 is a pinion 25 (Figure 10) fixed on a vertical shaft 113 rotating in a bearing 114 secured to the plate 103.

The upper end of the shaft 113 has fixed thereto a disc 24 provided with a crank pin 23 to which is connected the piston rod 22. The cylinder 20, in which the piston 21 operates, is pivotally connected at the end remote from the piston rod to a bracket 115 formed on a plate 116 secured and projecting from the plate 103.

The outer end of the piston rod 22 has secured thereto a member 41 projecting transversely, the outer extremity of which is slotted at 118 and has an adjustable block 119 secured to it by a clamping bolt passing through the slot.

The block 119 is adjustable so that at the inner dead centre position of the piston rod it moves the lever arm 40 of the main control valve 34 which is suitably secured to one of the legs 104 of the spider.

The over-riding valve 33 has a stirrup shaped member 120 of resilient strip metal secured to its side and so positioned as to be engaged by the end 121 of the piston rod 22 to depress the plunger 122 of the valve when the piston rod is a little beyond the outer dead centre position, that is to say, when in the position shown in Figure 5.

The number of teeth on the pinion 25 and on the gear wheel 26 are such that a single revolution of the pinion turns the head through an angle equal to the angular spacing between the transfer members, which in the construction illustrated is 30°.

It will be appreciated that the larger the number of transfer members employed and the smaller the angular spacing between them, the shorter will be the time interval required to move them from one stopped position to the next. In order to achieve an appreciable improvement in the reduction of this time interval as compared with apparatus previously proposed, the number of transfer members employed should not be less than five, corresponding to an angular separation of 72°.

The blocks 62 form in combination with the pivoted lever 63 the supporting spindle for which 123 is secured to the plate 103, a ratchet mechanism which permits rotation of the head in the forward direction, that is to say, anti-clockwise, as viewed in Figure 5, but which positively resists rotation of the head in the reverse direction during the return stroke of the piston rod 22 after the drive mechanism has over-run the outer dead centre position and is returning towards this position.

The faces 124 of the blocks which are engaged by the end faces 125 of the lever 63 are so arranged that they are at right angles to the length of the lever 63 as is also its end face which ensures that not only is there no tendency for this lever to be expelled from the locking position but also the stresses imposed on its end portion are purely compressive and the danger of fracture is considerably reduced as compared with a conventional pawl and ratchet mechanism.

It will also be observed that the novel arrangement of drive mechanism and pawl and ratchet mechanism adopted has the advantage that the drive mechanism is not fully active and tending to drive the head in its forward direction of rotation (that is to say, anti-clockwise as viewed in Figure 5) when the member or pawl 63 co-operates with one of the blocks 62 to arrest movement as is customarily the case with conventional mechanism in which the head is constantly urged to rotate in the forward direction but is periodically arrested by the engagement of a detent in a corresponding notch in an indexing disc.

The present arrangement ensures that not only does the drive unit serve to give forward motion to the head but is utilised in a particularly convenient manner to arrest the motion of the head in the neighbourhood of the stopped position in a more or less gradual manner so that final and accurate location of the head in the stopped position by the pawl and ratchet mechanism does not set up high stresses either in the pawl and ratchet mechanism itself or in the moving parts of the head by virtue of the high velocity with which they might otherwise be moving.

Article arresting member and article trip member

The article arresting member is a composite structure comprising a slide block 126 adapted to slide towards and away from the head in guides 7 extending towards the labelling station.

The forward portion 127 of the article arresting member is slidably supported in the slide block 126 by means of spaced parallel pins 128 extending through suitable openings in the slide block and headed at their outer ends as seen at 129, coiled compression springs 130 being disposed on the pins and operating between the forward portion 127 and the slide block 126 to space these apart.

The forward portion of the article arresting member has a V-shaped notch 131 provided in its forward end, the sides of which are intended to engage the sides of the article for labelling, so that this article may be precisely aligned with respect to the centre-line of the article arresting member as defined by the apex of the V and thus brought in accurate registration with the transfer member positioned at the labelling station.

The slide block 126 has an integrally formed projection 39 at one side in which is carried a rod 132, extending parallel to the guides 127, on which rod are carried, a pair of adjustable collars 133, between which is disposed a roller 134 carried at the outer end of the lever arm 38, forming the mechanical control means for the main control valve 30.

When the piston and cylinder unit 29 forming the pneumatically energised actuating device for the article arresting member moves the latter across the labelling station, the forward portion 127 is eventually arrested by engagement with an article, itself arrested by a resilient stop on the other side of the labelling station, but the slide block 126 is permitted to continue movement by virtue of the springs 130, which are thus compressed, and, at the extremity of this continued movement, the lever 38 is rocked through a sufficient angle to effect change-over of the main control valve 30 as previously described.

The resilient stop referred to above is shown in greater detail in Figures 11 and 12 and comprises a pair of upright posts 135 having adjustably secured thereto at or near their upper ends brackets (136) in which are provided holes for the reception of the ends of a U-shaped rod 137 so that this rod may pivot outwardly, that is to say, towards the article positioned at the labelling station, as indicated in Figure 11, under the action of coiled springs 138 disposed on each end of the rod and anchored at one of their ends to the rod and at the other end bearing against the associated bracket 136.

Similar brackets, springs and another U-shaped rod 139, inverted relatively to the rod 137, is connected to the posts at or near their lower ends, the two rods forming resilient stop means for the article which engages their outer faces at 140 and 141, while a free space is left between the central portions of these rods through which the transfer member can apply a label to the article.

In order to permit the initial position of the article arresting member together with its actuating piston and cylinder unit 29 to be adjusted towards and away from the labelling station in accordance with the cross sectional dimensions of the articles for labelling, these parts are mounted on a sliding bed 142 (Figure 4) supported on slides 143 and controlled by a screw 144 rotatable by means of a handle 145.

The slide block 126 of the arresting member has secured thereto the upwardly extending end portion 146 of the push rod 46, the inner end 147 of which engages the rocker 44 of that control valve 43 which is associated with the transfer member in register with the labelling station.

Also supported on the sliding bed 142 is the subsidiary control valve 31, the operating plunger 148 of which is engaged by an abutment on a sleeve 150 rotatably supported on an upstanding pillar 151.

The sleeve has a cut-away portion at its lower end and the abutment is formed by the resultant vertical edge 152.

This sleeve is rotated in response to the passage of an article for labelling into the labelling station by means of the trip member 32, comprising a radius arm 153 extending from the sleeve in a direction parallel to the direction of travel of the conveyor and an arm 154 adjustably secured to the arm 153 extending at right angles thereto towards the labelling station centrally of the V-shaped notch 131 in the forward portion 127 of the arresting member.

A particular advantage of this arrangement of article arresting member is that the article for labelling is arrested at the labelling station and moved against the resilient stop in a single movement of the actuating piston and cylinder unit 29, this movement also serving through the agency of the push rod 46 to convert the suction in the interior of the transfer member to a condition of pressure so that the label is applied with a minimum of delay to the article.

Thus a distinct saving in time is accomplished as compared with an arrangement in which movement of an article by an arresting member serves to actuate means whereby a transfer member is moved outwardly into a position closely adjacent the article for labelling, since this latter arrangement involves the time period occupied by the outward movement of the transfer member which must necessarily be performed after the inward movement of the arresting member, and it is only after this outward movement of the transfer member that conversion of the condition of suction to pressure can be advantageously performed.

The arrangement according to the present invention has the additional advantage that on retraction of the article arresting member, the article which has been labelled is automatically moved away from the transfer member by the resilient stop means and consequently there is no need to await withdrawal of a movable transfer member before a new rotational step can be imparted to the head.

*Label magazine*

Referring now especially to Figures 6 and 7, the label magazine, together with its actuating pneumatic piston and cylinder unit 27 are supported at the outer end of the leg 107 of the V-shaped member of the supporting structure referred to previously.

The pneumatic piston and cylinder unit 27 is pivotally supported at the end remote from its piston rod on an upstanding bracket 155 and its piston rod 156 is connected to a slide 157 which supports the magazine and which operates in guides 158 secured to the leg 107.

The slide 157 has secured thereto an inwardly extending arm 47, provided with a downwardly extending mounting block 160, to which is pivoted a trip lever 36 which is free to pivot and ride over a second lever 159 on inward movement of the slide and arm 47, but which on the outward movement of these parts is locked rigidly to the mounting block 160 by the engagement of abutment faces 161 on the trip lever and the mounting block so that in such outward movement, the lever 159 is depressed and the operating plunger 37 of the subsidiary control valve is depressed to open the valve. That part of the cycle of operations of the apparatus that results in an incremental rotational step being imparted to the head is thus initiated as previously described in connection with Figure 3.

The label magazine proper comprises a cage-like structure of upper and lower bars 162 and side bars 172 of which the inner ends are turned inwardly to form hooks 163 serving to retain in position the innermost label of the label pack, 164, the bars 172 being themselves supported by a bracket member 166 which is bolted to the slide.

The bracket structure 165 is adjustable laterally with respect to the base member 166 to adjust the separation between the bars 172.

The base member is provided with an inwardly projecting rod 47 which engages a plunger on that control valve 43 associated with the transfer member in register with the magazine whereby suction is applied to the interior of the transfer member on inward movement of the slide to replace the condition of exhaust previously obtaining in the interior of the transfer member.

Supported on an adjustable post 173 is a piston and cylinder unit 168 of which the piston rod 169 projects forwardly and has secured at its inner end, the plate 170 disposed within the cage structure of the magazine and bearing against the outer face of the label pack to exert substantially constant pressure against the labels.

A suitable pipe line connection indicated at 169 is taken from this piston and cylinder unit to the main pressure supply.

At the forward end of the cage structure, the label pack is encircled by a pipe line 170 having a plurality of inwardly directed orifices 171 which enable air jets to be applied laterally in the neighbourhood of the edge of the innermost label to ensure that this is readily separated from the next label and guard against the possibility of extraction of two labels at the same time by the transfer member.

The upper and lower bars 162 of the cage structure are supported by blocks 174 (Figure 7) slidable vertically on a bracket 175 and capable of being adjusted vertically by means of a screw 176 having threaded portions of opposite hands engaging internally screw threaded portions in the blocks so that these are moved apart or more closely together depending upon the direction of rotation of the screw which can be effected manually by means of a knurled head 177.

*Adhesive applying device*

Referring now especially to Figures 8 and 9, the adhesive applying device is supported on the leg 106 of the V-shaped member previously referred to and comprises a container 178 for liquid adhesive, a pair of endless travelling belts 179 and adhesive transfer elements for conveying liquid adhesive from the container to moisten the belts.

The belts 179 are supported on a pair of rollers 180 and 181 journalled in a frame 182 on axes which are parallel to each other and are spaced vertically apart and are also parallel with the direction made by a tangent drawn to the path of movement traced out by the transfer members at the point of registration with the adhesive applying device.

The frame 182 is pivotally connected to a fixed supporting bracket 183 at 184 and can be rocked towards and away from the head by vertical movement of an inwardly extending arm 185 of which the outer end is bifurcated as seen at 186 (Figure 5) and is fixed to the frame 182.

The necessary vertical movements are given to the arm 185 by a link 6 connected to a lever arm 187 fixed to a spindle 188 supported in a bearing 189 fixed to one leg of the spider 104 and provided with a rocker arm 190, the end of which is pivotally connected to the piston rod 191 of the piston and cylinder unit 28 forming the actuating means for the adhesive applying device.

The piston and cylinder unit is suitably supported on a bracket structure 192 fixed to the cross member 108 of the spider.

In order to impart periodical movement to the belts 179 each time the frame is rocked towards and away from the head, the spindle 193 to which the upper roller 181 is fixed has also a ratchet wheel 194 fixed thereto and cooperating with this ratchet wheel is a spring loaded pawl 195 supported in a carrier 196 pivoted to the spindle 193.

A link 197 connects the carrier to the upper end of a fixed and upwardly extending bar 198 so that as the frame 182 is rocked forwardly towards the head the lower end of the carrier 196 remains fixed in position but the ratchet 194 is rotated relatively to the pawl so that the latter slides over the teeth of the ratchet in a clockwise direction as viewed in Figure 9.

On the return movement of the frame away from the head relative rotation between the pawl and ratchet is prevented by engagement of the pawl with the abutment face of one of the teeth of the ratchet so that a rotational step is imparted to the ratchet and consequently to the roller 181.

The adhesive transfer elements for applying a coating of adhesive to the outer face of the belts comprises a drum 199 supported in bearings formed in the outer ends of lower and rearwardly extending arms of the frame 182. Between the drum and the belts is interposed a roller 200 mounted on the spindle about which the frame can rock.

In order to impart the same rotational movement as is imparted to the upper roller 181, to the lower roller, and to the adhesive transfer elements, sprockets 201 are provided on the ends of the spindles supporting these rollers, and transfer elements, around which sprockets is passed a chain 202 in the manner illustrated so that the rotational movements transmitted are in the correct sense.

Figure 18:
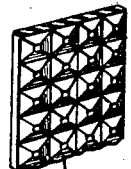
Figure 18 is a fragmentary view showing the formation of the surface of the belt used in the adhesive applying device.
Figure 16:
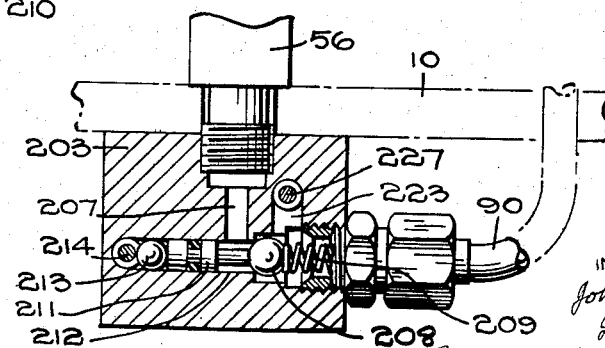
Figure 16 is a cross sectional view on the line 16—16 of Figure 14 of the control valve shown therein.

The belts 179 are illustrated in greater detail in Figure 18 and it will be observed that the outer surface thereof has distributed over it a plurality of projections of which the terminations or end faces are substantially co-planer. Thus, individual elements of adhesive are applied to the label by these end faces or terminations, while the spaces between the projections permitting the circulation of air or the retention of an air pocket between the label and the belt, thus considerably reducing the possibility that the label may be stripped from the transfer member when the belt is retracted therefrom.

*Controlling valves*

The pneumatic piston and cylinder actuating units employed together with the main control valves and the subsidiary valves, excepting those associated directly with the transfer members, are all of conventional construction and hence the details of their internal construction need not be described.

The valves 43 associated with each transfer member are, however, designed especially to meet the requirements imposed by the manner in which the transfer members are desired to operate and these valves have therefore been illustrated in detail in Figures 13 to 16.

Each control valve 43 comprises a body 203 secured to the underside of the disc and having three inwardly extending and mutually perpendicular passageways or bores, one of which 204 receives the junction member of the output pipeline 90 to the associated transfer member, another of which 206 receives the junction member of the pressure supply pipe line 68 and the third 207 of which receives the junction member from the suction supply pipe-line 56.

Communication between the bores 207 and 204 to establish suction in the transfer member is controlled by blocking means in the form of a spring-pressed ball 208 which is biassed by its spring 209 against a seating 210 in the bore 204, but which can be moved off the seating to place bores 207 and 204 in communication by a piston member 211 movable endwise in an extension 212 of the bore 204 by means of a ball 213. The ball 213 is itself movable along the extension bore 212 by means of a plunger 214 slidable in a further bore 215 at right angles to the extension bore 212, the plunger having a recess 216 which, when in registration with the end of the extension bore 212, permits the ball 213 to be moved to the outermost end thereof under the influence of the spring 209 so that the ball 208 rests on its seating and seals off the output bore 204 from the suction bore 207. This position is illustrated in Figure 4.

If, however, the plunger 214 is depressed by the engagement of its head 217 by the push rod 167 of the magazine slide, the chamfered end wall 218 of the recess impels the ball 213 fully into the extension bore, thus, through the intermediary of the piston member moving the ball 208 off its seating and causing the output and suction bores 204 and 207 to be placed in communication.

Furthermore, it will be apparent that this mechanism is non-self-reversing; the plunger 214 having been depressed, remains depressed until restored to its former position by engagement by the push rod 46, at the labelling station, with the end 219 of the rocker 220 opposite to the end 221. The latter end has an opening 222 through which the stem of the plunger passes. Thus, suction having been applied to the associated transfer member at the magazine station, it remains in being until converted to pressure at the labelling station.

Figure 15:
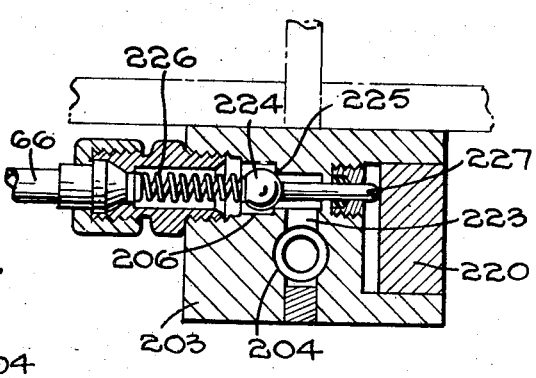
Figure 15 is a cross sectional view on the line 15—15 of Figure 13 of the control valve shown therein.

Considering now the control of communication between the output bore 204 and the pressure bore 206, best seen in Figure 15, this is effected through the short passageway 223 (Figures 15 and 16) and is under the control of blocking means in the form of a ball 224 loaded onto its seating 225 in the pressure bore 206 by a spring 226 to seal the output and pressure bores from each other.

Figure 14:
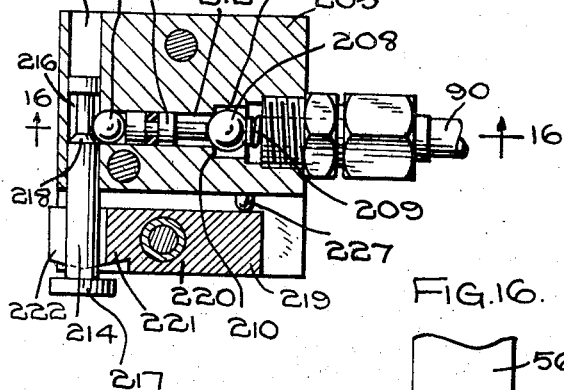
Figure 14 is a cross sectional view on the line 14—14 of Figure 13 of the control valve shown therein.

The ball 224 is, however, removable from its seating by a plunger 227 the outer end of which bears against the inner face of the rocker 220 at the end 219 thereof (Figure 14).

Whenever this end 219 of the rocker is depressed, as by the push rod 46 at the labelling station, the ball 224 is pushed off its seating and the output and pressure bores placed in communication.

This mechanism is self-returning under the influence of the spring 226, so that the valve reverts to the condition in which both pressure and suction bores are sealed off from the output bore when the push rod 46 of the article arresting member is withdrawn from engagement with the rocker 220. The associated transfer member thus remains in a condition of exhaust to the atmosphere, (through its own openings), during travel from the labelling station to the label magazine station.

What I claim then is:

1. In an apparatus for labelling articles wherein labels are extracted from a magazine with the aid of pneumatic suction applied through transfer members, moved by the latter to an adhesive applying device for coating the labels with adhesive, and moved subsequently to a labelling station at which they are delivered onto the articles by means of pneumatic pressure applied through the transfer members; a supporting structure, a rotary head carried thereby, a plurality of transfer members supported fixedly thereon, said transfer members being spaced apart at equal angular intervals around the axis of rotation of the head, a label magazine movably mounted on said supported structure for movement in a direction towards and away from the head, an adhesive applying device mounted on said supporting structure in a like manner, and means carried on said supporting structure for moving the magazine and the adhesive applying device towards and away from the head, a resilient stop device positioned at a labelling station and having portions engageable by an article thereat, which portions lie in a region defined by the plane of the operative face of the transfer member at the labelling station and an approximately parallel plane spaced outwardly from the transfer member, and means for pressing an article for labelling against said portions.

2. In an apparatus for labelling articles wherein labels are extracted from a magazine with the aid of pneumatic suction applied through transfer members, moved by the latter to an adhesive applying device for coating the labels with adhesive, and moved subsequently to a labelling station at which they are delivered onto the articles by means of pneumatic pressure applied through the transfer members; a supporting structure, a rotary head carried thereby, a plurality of transfer members supported fixedly thereon, said transfer members being spaced apart at equal angular intervals around the axis of rotation of the head, a label magazine movably mounted on said supported structure for movement in a direction towards and away from the head, an adhesive applying device mounted on said supporting structure in a like manner, and means carried on said supporting structure for moving the magazine and the adhesive applying device towards and away from the head, a resilient stop device positioned at a labelling station comprising upper and lower members spaced vertically apart above and below the zone of the article to which it is required to apply a label, said members having portions engageable by an article thereat, which portions lie in a region defined by the plane of the operative face of the transfer member at the labelling station and an approximately parallel plane spaced outwardly from the transfer member, and means for pressing an article for labelling against said portions.

3. In an apparatus for labelling articles of the kind provided with a plurality of transfer members supported on a rotary head and facing outwardly of the axis of rotation thereof for cooperation with labels in a magazine, an adhesive applying device, and an article for labelling, disposed respectively at spaced positions around the head; means for rotating the head intermittently, comprising the combination of means for driving the head in the forward direction through an angle greater than the angular separation of the transfer members, means for subsequently driving the head in the reverse direction, and positive stop means inoperative during forward movement of the head and co-acting therewith to arrest the head at the required position during reverse movement.

4. In an apparatus for labelling articles of the kind provided with a plurality of transfer members supported on a rotary head and facing outwardly of the axis of rotation thereof for cooperation with labels in a magazine, an adhesive applying device, and an article for labelling, disposed respectively at spaced positions around the head; means for rotating the head intermittently, comprising the combination of a driving unit having an output element operatively connected to the head, and movable under the influence of power applied to the unit to impart forward movement to the head through an angle greater than the angular separation of the transfer members, said element being reversible at the extremity of said forward movement under the influence of said power to reverse the direction of movement of the head, and positive stop means inoperative during forward movement of the head and co-acting therewith to arrest the head at the required position during reverse movement.

5. In an apparatus for labelling articles of the kind provided with a plurality of transfer members supported on a rotary head and facing outwardly of the axis of rotation thereof for cooperation with labels in a magazine, an adhesive applying device, and an article for labelling, disposed respectively at spaced positions around the head; means for rotating the head intermittently, comprising the combination of a double acting piston and cylinder unit coupled to a rotary crank geared to the head, a valve controlling the admission of air to one side of the piston or the other, mechanism connecting the valve and said unit for automatically changing over the valve at one end of the piston stroke, the piston being subjected to the yieldable braking pressure of the air at the other end of the stroke to arrest it at this end after at least one over-run and effect return movement, and, pawl and ratchet mechanism operatively connected to the head to resist positively reverse movement of the head during said return movement, and arrest the head in one of a number of accurately defined positions in which transfer members register with the magazine, the adhesive applying device and the labelling station.

6. In an apparatus for labelling articles of the kind provided with a supporting structure, an intermittently rotatable head mounted thereon, a plurality of outwardly facing transfer members mounted on said head and adapted to be supplied at different portions of the path along which they travel with pneumatic suction or pressure to retain labels on said members while co-operating with an adhesive applying device, or to project adhesive coated labels onto articles positioned successively at a labelling station; a label magazine movably mounted on said supporting structure for movements towards and away from the head, said magazine having actuating means for moving it inwardly towards the head in synchronism with the stationary periods of the head, and, a control device operatively associated with the head and co-operating with a member on said magazine in the outward movement thereof, to initiate an incremental rotational step of the head.

7. In an apparatus for labelling articles of the kind provided with a supporting structure, an intermittently rotatable head mounted thereon, a plurality of outwardly facing transfer members mounted on said head and adapted to be supplied at different portions of the path along which they travel with pneumatic suction or pressure to retain labels on said members while co-operating with a label magazine, or to project adhesive coated labels onto articles positioned successively at a labelling station; an adhesive applying device comprising an endless travelling belt supported on rollers journalled in a frame movably mounted on said supporting structure for movement towards and away from the head, said device having actuating means for moving it inwardly towards the head in synchronism with the stationary periods of the head, means for coating the belt with adhesive, and mechanism operatively connected to at least one of said rollers for rotating it intermittently in response to said movement of the device towards and away from the head.

8. In an apparatus for labelling articles of the kind provided with a supporting structure, an intermittently rotatable head mounted thereon, a plurality of outwardly facing transfer members mounted on said head and adapted to be supplied at different portions of the path along which they travel with pneumatic suction or pressure to retain labels on said members while co-operating with a label magazine, or to project adhesive coated labels onto articles positioned successively at a labelling station; an adhesive applying device comprising a frame pivotally mounted on said supporting structure about an axis parallel to a tangent to the path traversed by said transfer members and spaced outwardly therefrom, a pair of rollers journalled in said frame on axes parallel to said pivotal axis and spaced vertically apart from said axis and from each other, an endless travelling belt supported on said rollers, a container for liquid adhesive, adhesive transfer elements carried by the frame and operatively interposed between adhesive in said container and said belt, actuating means for rocking said frame to move at least one run of the belt towards and away from the said path, a pawl and ratchet mechanism connected to at least one of said rollers and having its elements driven relatively to each other to impart an incremental rotational step to said roller by a link connecting one of said elements to a member fixed to said supporting structure.

9. In an apparatus for labelling articles of the kind provided with a supporting structure, an intermittently rotatable head mounted thereon, a plurality of outwardly facing transfer members mounted on said head and adapted to be supplied at different portions of the path along which they travel with pneumatic suction or pressure to retain labels on said members while co-operating with a label magazine, or to project adhesive coated labels onto articles positioned successively at a labelling station; an adhesive applying device comprising an endless travelling belt having distributed over its outer face a plurality of projections of which the terminations are substantially co-planar, said belt being supported on rollers journalled in a frame movably mounted on said supporting structure for movement towards and away from the head, said device having actuating mean for moving it inwardly towards the head in synchronism with the stationary periods of the head.

10. In an apparatus for labelling articles, the combination of, a head rotatable about a vertical axis and provided with a plurality of outwardly facing transfer members for extracting labels from a magazine, for co-operating with an adhesive applying device and for delivering the adhesive coated labels to articles positioned successively at a labelling station, with a supporting structure for said head comprising, a base portion, and mounted thereon, an upper portion adjustable relatively to said base portion in a vertical direction, said upper portion carrying said head, said magazine, and said adhesive applying device, and also an article arresting device positioned outwardly of the labelling station and movable towards the head across said labelling station.

11. In apparatus for labelling articles, of the kind having an intermittently rotatable head, a plurality of outwardly facing transfer members mounted on said head, and adapted to be supplied at different portions of the path along which they travel with pneumatic suction or pressure to retain labels on said members while co-operating with a label magazine and an adhesive applying device, or to project adhesive coated labels onto articles positioned successively at a labelling station; a plurality of pneumatically energised actuating devices connected respectively with the magazine, the adhesive applying device, and an article arresting member at the labelling station, all respectively for moving these parts inwardly and outwardly with respect to the head, a main control valve and a pipe line system connecting same to said actuating device for the magazine, said adhesive applying device and said arresting member, a trip member disposed in the path of articles fed to the labelling station, means connecting said trip member with said main control valve for setting same in a position to effect inward movement of the arresting member, the magazine, and the adhesive applying device, in response to the approach of an article, means connecting said main control valve with said article arresting member for returning said valve to its original position at the inner extremity of movement of said arresting member, to effect return of said arresting member, magazine and adhesive applying device to their outer positions.

12. In apparatus for labelling articles of the kind having an intermittently rotatable head, a plurality of outwardly facing transfer members mounted on said head, and adapted to be supplied at different portions of the path along which they travel with pneumatic suction or pressure to retain labels on said members while co-operating with a label magazine and an adhesive applying device, or to project adhesive coated labels onto articles positioned successively at a labelling station; a plurality of pneumatically energized actuating devices connected respectively with the head for rotating same, the magazine, the adhesive applying device, and an article arresting member at the labelling station, all respectively for moving these parts inwardly and outwardly with respect to the head, a main control valve, a pipe line system connecting same to the actuating devices for said magazine, said adhesive applying device and said arresting member, a trip member disposed in the path of articles fed to the labelling station, means connecting said trip member with said main control valve for setting same in a position to effect inward movement of the arresting member, the magazine, and the adhesive applying device, in response to the approach of an article, means connecting said main control valve with said article arresting member for returning the valve to its original position at the inner extremity of movement of said arresting member, to effect return of said arresting member, magazine and adhesive applying device to their outer positions, and a second main control valve, a pipe line system connecting same to the actuating device for rotating the head, and means operable by a member movable in the outward movement of said arresting member, magazine, and adhesive applying device for setting said second main control valve in a position to initiate a single cycle of operations of said head actuating device.

13. In apparatus for labelling articles, of the kind having an intermittently rotatable head, a plurality of outwardly facing transfer members mounted on said head, and adapted to be supplied at different portions of the path along which they travel with pneumatic suction or pressure to retain labels on said members while co-operating with a label magazine and an adhesive applying device, or to project adhesive coated labels onto articles positioned successively at a labelling station; control valves on said head, said valves being connected to respective transfer members, and, inwardly movable change-over members operatively connected to said magazine, and to an article arresting member at the labelling station, said inwardly movable members co-acting with said valves to establish a pneumatic suction or pressure supply to their respective transfer members.

14. In apparatus for labelling articles, of the kind having an intermittently rotatable head, a plurality of outwardly facing transfer members mounted on said head, and adapted to be supplied at different portions of the path along which they travel with pneumatic suction or pressure to retain labels on said members while co-operating with a label magazine and an adhesive applying device, or to project adhesive coated labels onto articles positioned successively at a labelling station; control valves on said head, said valves being connected to respective transfer members, and, inwardly movable change-over members operatively connected to said magazine, and to an article arresting member at the labelling station, said inwardly movable members co-acting with said valves to establish a pneumatic suction or pressure supply to their respective transfer members, and a suction reservoir individual to each control valve connected between the valve and a common suction source through an orifice to limit the loss of suction in the absence of a label on the respective transfer member when supplied with suction.

15. In an apparatus for labelling articles of the kind provided with a plurality of transfer members supported on a rotary head and facing outwardly of the axis of rotation thereof for co-operation with labels in a magazine, an adhesive applying device, and an article for labelling; and elastically yieldable drive mechanism operatively connected to the head, means for applying an increment of energy to said mechanism to drive same in a direction and through a distance corresponding to a forward angular movement of the head equal to the angular separation of adjacent transfer members whereby after cessation of said application the head overruns and then reverses, and, positive stop means inoperative during forward movement of the head and co-operating with the head to arrest same at the required position during its reverse movement.

16. In an apparatus for labelling articles of the kind provided with a plurality of transfer members supported on a rotary head and facing outwardly of the axis of rotation thereof for cooperation with labels in a magazine, an adhesive applying device, and an article for labelling; means for rotating the head intermittently comprising the combination of, a driving unit including a movable output element operatively connected to the head to rotate same, and including an actuating device having a body and a member movable relatively thereto, which member is connected to said output element to drive same, means for conveying to said actuating device a power transmitting medium for imparting elastically to said member either a driving or retarding force relatively to said body, means for controlling the sense or direction of application of said medium to drive said actuating device firstly in a direction corresponding with forward movement of the head and to an extent corresponding with the angular separation between adjacent transfer members, and subsequently to restrain said device whereby the head overruns and then reverses, and, positive stop means inoperative during forward movement of the head and co-operating with the head to arrest same at the required position during its reverse movement.

17. In an apparatus for labelling articles of the kind provided with a plurality of transfer members supported on a rotary head and facing outwardly of the axis of rotation thereof for cooperation with labels in a magazine, an adhesive applying device, and an article for labelling; means for rotating the head intermittently comprising the combination of, a driving unit including an output element movable cyclically and operatively connected to the head to rotate same in one cycle of movement of said element through an angle equal to the angular separation of adjacent transfer members and including an actuating device having a body and a member movable relatively thereto, which member is connected to said output element to drive same, means for conveying to said actuating device a power transmitting medium for imparting elastically to said member either a driving or retarding force relatively to said body, control means for applying at the completion of a cycle of movement of said output element said medium to said actuating device in a retarding sense whereby the head overruns and then reverses, and, positive stop means inoperative during forward movement of the head and co-operating with the head to arrest same at the required position during its reverse movement.

18. In an apparatus for labelling articles of the kind provided with a plurality of transfer members supported on a rotary head and facing outwardly of the axis of rotation thereof for cooperation with labels in a magazine, an adhesive applying device, and an article for labelling; means for rotating the head intermittently comprising the combination of, a driving unit including a rotary output element and operatively connected to the head to rotate same in one rotation of said element through an angle equal to the angular separation of adjacent transfer members, and including an actuating device having a body and a member movable relatively thereto, which member is connected to said output element to drive same, means for conveying to said actuating device a power transmitting medium for imparting elastically to said member either a driving or retarding force relatively to said body, control means for applying at the completion of one rotation of said output element said medium to said actuating device in a retarding sense whereby the head overruns and then reverses, and, positive stop means inoperative during forward movement of the head and co-operating with the head to arrest same at the required position during its reverse movement.

19. In an apparatus for labelling articles of the kind having a rotatable head, and a plurality of outwardly facing transfer members mounted on the head and adapted to be supplied at different portions of the path along which they travel with pneumatic suction or pressure to retain labels on said members while co-operating with a label magazine and an adhesive applying device, or to project adhesive coated labels onto articles positioned successively at a labelling station; means for moving said magazine and an article for labelling inwardly towards the head, means for conveying a suction or pressure air supply to said transfer members, said means including control valves operatively connected to respective transfer members to determine in accordance with their setting the nature of the supply furnished, and, change-over members adapted for movement with said magazine and said article towards the head and co-acting with said valves to change their settings when said valves are positioned in register with the magazine and labelling station, whereby the transfer member in register with said magazine is furnished with a suction supply as said magazine approaches it, and the transfer member at the labelling station is furnished with a pressure supply as said article approaches it.

20. In an apparatus for labelling articles of the kind having a rotatable head, and a plurality of outwardly facing transfer members mounted on the head and adapted to be supplied at different portions of the path along which they travel with pneumatic suction or pressure to retain labels on said members while co-operating with a label magazine and an adhesive applying device, or to project adhesive coated labels onto articles positioned successively at a labelling station; means for moving said magazine and an article for labelling inwardly towards the head, means for conveying a suction or pressure air supply to said transfer members, said means including control valves for respective transfer members which valves each have a body in which are formed communicating passageways connected respectively to the transfer member, a source of pneumatic pressure, and a source of pneumatic suction, each valve further having means for blocking communication between the passageway connected to the transfer member and the other said passageways, and control mechanism for selectively actuating said blocking means to place one or the other of said suction or pressure passageways in communication with said transfer member passageway, change-over members adapted for movement with said magazine and said article towards the head and coacting with said control mechanism whereby the transfer member in register with said magazine is furnished with a suction supply as said magazine approaches it, and the transfer member at the labelling station is furnished with a pressure supply as said article approaches it.

21. In an apparatus for labelling articles of the kind having a rotatable head and a plurality of outwardly facing transfer members mounted on the head and adapted to be supplied at different portions of the path along which they travel with pneumatic suction or pressure to retain labels on said members while co-operating with a label magazine and an adhesive applying device or to project adhesive coated labels onto articles positioned successively at a labelling station; means for moving said magazine and an article for labelling inwardly towards the head, means for conveying a suction or pressure air supply to said transfer members, said means including control valves for respective transfer members which valves each have a body in which are formed communicating passageways connected respectively to the transfer members, a source of pneumatic pressure, and a source of pneumatic suction, each valve further having means for blocking communication between the passageway connected to the transfer member and the other said passageways, and control mechanism for selectively actuating said blocking means to place one or the other of said suction or pressure passageways in communication with said transfer member passageway, said control mechanism including a biasing device co-operating with the blocking means controlling communication between said transfer members and pressure passageway to render said means operative, change-over members adapted for movement with said magazine and said article towards the head and co-acting with said mechanism in opposition to said biasing device whereby the transfer member in register with said magazine is furnished with suction supply as said magazine approaches it, and the transfer member at the labelling station is furnished with a pressure supply only when an article is moved into the operative range of said transfer member.

22. In an apparatus for labelling articles of the kind provided with a supporting structure, an intermittently rotatable head mounted thereon, a plurality of outwardly facing transfer members mounted on said head and adapted to be supplied at different portions of the path along which they travel with pneumatic suction or pressure to retain labels on said members while co-operating with a label magazine, or to project adhesive coated labels onto articles positioned successively at a labelling station; an adhesive applying device mounted on said supporting structure, and including an element for applying adhesive to labels retained on a transfer member when in register with said device, and means for coating said element with adhesive, said device having actuating means for moving at least said element towards and away from the head, and mechanism driven by said actuating means for operating said coating means automatically during at least part of said movement.

23. Indexing mechanism for a rotary head, comprising, means for driving said head in a forward direction through an angle greater than the angular separation between required adjacent indexed positions, means for subsequently driving said head in the reverse direction, and positive stop means inoperative during the forward movement of said head and co-operating therewith to arrest said head at the required position during its reverse movement.

24. Indexing mechanism for a rotary head, comprising, an elastically yieldable drive mechanism operatively connected to the head means for applying an increment of energy to said mechanism to drive same in a direction, and through a distance, corresponding to a forward angular movement of the head equal to the angular separation between required adjacent indexed positions, whereby after cessation of said application the head overuns and then reverses, and, positive stop means inoperative during the forward movement of said head and cooperating therewith to arrest said head at the required position during its reverse movement.

25. Indexing mechanism for a rotary head, comprising, a driving unit including a movable output element operatively connected to the head to rotate same, and including an actuating device having a body and a member movable relatively thereto, which member is connected to said output element to drive same, means for conveying to said power actuating device a power transmitting medium for imparting elasticity to said member either a driving or retarding force relatively to said body, means for controlling the sense or direction of application of said medium to drive said actuating device firstly in a direction corresponding with forward movement of the head and to an extent corresponding to the angular separation between required adjacent indexed positions, and subsequently to restrain said device whereby the head overruns and then reverses, and, positive stop means inoperative during the forward movement of said head and co-operating therewith to arrest said head at the required position during its reverse movement.

26. Indexing mechanism for a rotary head, comprising, means for rotating the head intermittently, comprising the combination of a double acting piston and cylinder unit coupled to a rotary crank geared to the head, a valve controlling the admission of air to one side of the piston or the other, mechanism connecting the valve and said unit for automatically changing over the valve at one end of the piston stroke, the piston being subjected to the yieldable braking pressure of the air at the other end of the stroke to arrest it at this end after at least one overrun and effect return movement, and, pawl and ratchet mechanism operatively connected to the head to resist positively reverse movement of the head during said return movement, and arrest the head in one of the indexing positions.

JOHN PHILIP LISSIMORE.

REFERENCES CITED

The following references are of record in the file of this patent:

UNITED STATES PATENTS

| Number | Name | Date |
| --- | --- | --- |
| 781,333 | Edson | Jan. 31, 1905 |
| 1,007,080 | Evans | Oct. 31, 1911 |
| 2,065,957 | Wrange | Dec. 29, 1936 |
| 2,214,096 | Weiss | Sept. 10, 1940 |
| 2,247,623 | Von Hofe | July 1, 1941 |
| 2,542,282 | Lissimore | Feb. 20, 1951 |